(12) United States Patent
Barghini et al.

(10) Patent No.: US 6,778,764 B2
(45) Date of Patent: Aug. 17, 2004

(54) STROBE CONTROLLER SYSTEM WITH FLASH UNIT INTEROPERABILITY

(75) Inventors: Anthony Barghini, Pacific Grove, CA (US); Theodore C. Sorom, Pacific Grove, CA (US)

(73) Assignee: Light and Motion Industries, Inc., Monterey, CA (US)

(*) Notice: Subject to any disclaimer, the term of this patent is extended or adjusted under 35 U.S.C. 154(b) by 0 days.

(21) Appl. No.: 10/340,870

(22) Filed: Jan. 10, 2003

(65) Prior Publication Data

US 2004/0136702 A1 Jul. 15, 2004

(51) Int. Cl.[7] .......................... G03B 17/08; G03B 15/03
(52) U.S. Cl. .......................... 396/28; 396/159; 396/182
(58) Field of Search .......................... 396/28, 159, 160, 396/163, 182, 189; 348/370, 371

(56) References Cited

U.S. PATENT DOCUMENTS

| | | | | |
|---|---|---|---|---|
| 4,457,602 A | * | 7/1984 | Mizokami | 396/161 |
| 5,570,148 A | * | 10/1996 | Hibino et al. | 396/182 |
| 6,029,013 A | * | 2/2000 | Larkin et al. | 396/160 |
| 6,512,890 B2 | * | 1/2003 | Kawasaki et al. | 396/157 |

* cited by examiner

*Primary Examiner*—Russell Adams
*Assistant Examiner*—Arthur Smith
(74) *Attorney, Agent, or Firm*—Michael Hetherington; Morrison Ulman

(57) ABSTRACT

A microprocessor based strobe controller provides an interface between a digital camera and one or more strobe units. The strobe controller provides interoperability and enhanced user control by enabling the user to vary separately the light output of a variety of strobes of different manufacturers. The strobe controller enables a user to take pictures using digital TTL manual bracketing based on TTL feedback and full manual operation with the ability to adjust light output over a plurality of power levels with any TTL strobe. The strobe controller may be incorporated in a housing for operatively enclosing a digital camera for use underwater or in harsh environments. The housing provides a communication link between the camera and one or more strobes, and includes an intuitive user interface that accesses camera functions, strobe controller functions and gives visual strobe control feedback.

7 Claims, 13 Drawing Sheets

| Strobe Power Level | Cumulative Light Output | Strobe-On Time (us) |
|---|---|---|
| Full | 767 | 10000 |
| -1/2 | 575 | 2579 |
| -1 | 383 | 1283 |
| -1 ½ | 287 | 880 |
| -2 | 192 | 562 |
| -2 ½ | 144 | 425 |
| -3 | 56 | 299 |
| -3 ½ | 72 | 239 |
| -4 | 48 | 181 |
| -5 | 24 | 119 |
| -6 | 12 | 82 |
| -7 | 6 | 61 |

Fig 4

STROBE CONTROLLER SYSTEM WITH FLASH UNIT INTEROPERABILITY

FIELD OF THE INVENTION

The field of the invention relates generally to strobe lighting for digital photography. In particular, the field of the invention relates to a system and method for providing an interface unit that is used between a digital camera and one or more strobe units that provides greater flexibility in flash usage and enables photographers to achieve the correct amount of light output to properly expose photographs without having to change camera aperture and shutter speed settings. The strobe controller also provides interoperability for a wide variety of strobes.

BACKGROUND OF RELATED ART

Flash photography has become a very standard photographic technique in the past 30 years. Today all cameras except for the very cheapest disposable cameras come standard with a built in flash. Higher end cameras allow for the attachment of an accessory external flash unit to give the user greater flexibility in flash usage as well as greater light output. Generally these higher end cameras have a system to control both the internal and external flash automatically to achieve the correct photographic exposure. A system commonly referred to as "Through the Lens" or TTL metering has become the default system in film cameras to control the flash output. In this system, the camera measures the light hitting the film plane and when enough light has been received to achieve the proper exposure, the flash unit is turned off. This system works through a connection between the camera and the strobe that allows for the transmission of two signals. One signal is used to start the flash and another is used to tell the flash unit when to extinguish.

This system is the de facto standard across a vast majority of film camera manufacturers that support automatic external flash control.

In the past few years digital cameras (cameras that store pictures on memory chips instead of chemically developed film) have become very popular and are beginning to replace the before mentioned film cameras in the marketplace. Unfortunately the digital cameras that do support external flash units often do not support the automatic flash control technique described above because of technological limitations. To work around this limitation, some manufacturers use a light sensor on the body of the camera to determine when enough light has been received to achieve the correct exposure and extinguish the flash. This system, however, is notoriously inaccurate because the light that hits the sensor can be very different than the light that actually enters the lens.

Other manufacturers use a double flash system where an initial short flash is used to light the scene and determine how much light is necessary for the main exposure. Next the main flash is activated in conjunction with the opening of the shutter on the camera. During the exposure, the camera shuts off the flash after a preset amount of time calculated from the initial pre-flash exposure. This system requires that the camera know exactly the operation of an external flash unit so that it can correlate the pre-flash exposure with the amount of light that will be released over time from an external strobe. This has led camera manufacturers to use proprietary communication protocols between the strobe and camera to achieve this automatic flash system. This in turn means that many older flash units do not work in an automatic fashion with these digital cameras. Thus, users must buy a new camera specific flash unit or use manual flash output which limits their exposure options.

Therefore what is needed is a strobe controller for a digital camera that can provide photographers a way to achieve greater flexibility in flash usage and achieve the correct amount of light output to properly expose photographs without having to change camera aperture and shutter speed settings.

SUMMARY

In order to achieve the foregoing and other objectives, an aspect of the invention comprises a microprocessor based strobe controller that provides an interface between a digital camera and one or more existing strobe units. The strobe controller provides enhanced user control over the strobes by enabling the user to control the light outputs of a wide variety of different strobes. The strobe controller also provides interoperability for a plurality of strobes of different manufacturers. For example, the strobe controller enables a user to take pictures using digital TTL, manual bracketing based on TTL feedback and full manual operation with the ability to adjust light output over a plurality of levels with any TTL strobe.

In another aspect of the invention, the microprocessor based strobe controller enables external strobes to be adjusted separately. For example, one strobe may be adjusted to full power while another can be adjusted to half power. Also, strobes from different manufacturers can be made to interoperate with a desired camera.

In another aspect of the invention, the strobe controller is incorporated in a housing for operatively enclosing a digital camera for use underwater or in harsh environments. The strobe controller is integral with the housing, and the housing is configured to provide a communication link between the camera and one or more strobes. The housing further includes an intuitive user interface that accesses camera functions, strobe controller functions and gives visual strobe control feedback. The housing is also provided with a strobe control interface that enables a user to control one or more strobes from the housing.

BRIEF DESCRIPTION OF THE DRAWINGS

These and other features, aspects and advantages of the invention will become better understood with regard to the following descriptions, appended claims and accompanying drawings in which:

FIG. 4 is a table showing a typical strobe light output profile in accordance with an aspect of the present invention.

DETAILED DESCRIPTION

Figure 1A:
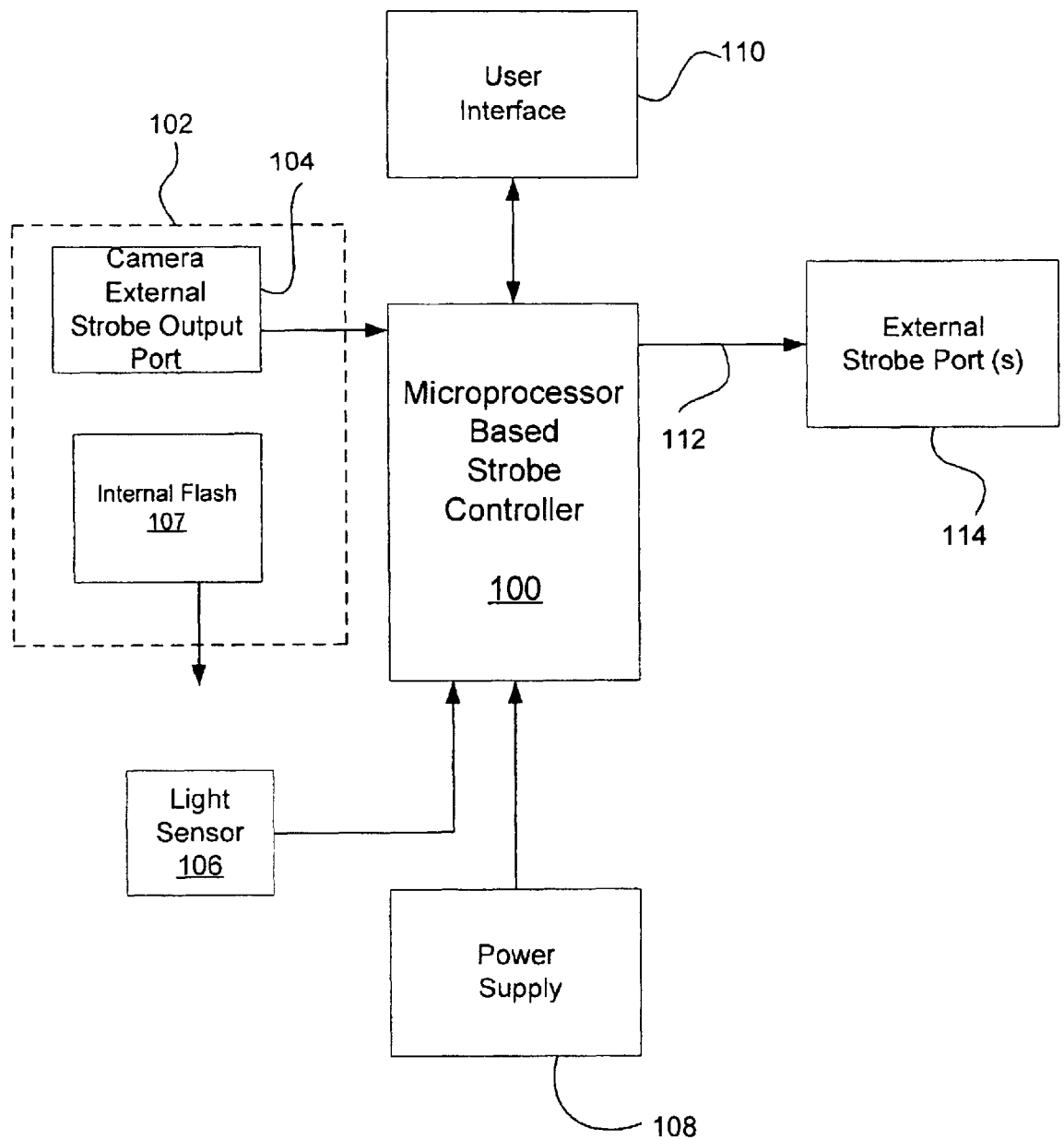
FIG. 1A is a block diagram showing the context of a microprocessor based strobe controller in accordance with an aspect of the present invention.

FIG. 1A shows a microprocessor based strobe controller 100 that is external to the camera 102. The strobe controller is powered by any convenient power supply 108 such as a battery. The strobe controller 100 is designed to accept a signal that is synchronized with the initiation of the camera's image capture. FIG. 1A shows an aspect of the invention where strobe controller 100 is connected to the camera 102 such that it can receive the flash on and off signals generated by the camera through external strobe output port 104. In another aspect of the invention, the strobe controller 100 contains a light sensor 106 for monitoring the camera's internal flash 107. This can also be utilized for detecting the initiation of the camera's image capture and, as will be discussed later, used to determine automatic exposure flash on and off signals. The strobe controller 100 comprises a user interface 110 and output communication link 112 for connection with input port(s) of one or more corresponding external strobes 114. A method for activating the strobes in synchronization with signals provided from the camera is set forth in U.S. Pat. No. 6,029,013 which is incorporated herein by reference.

The strobe controller provides enhanced user control over the external strobe. A preferred signal methodology for triggering and modulating a remote light source in response to one or more indications provided from a camera is shown in U.S. Pat. No. 5,974,273, which is incorporated as if set forth in full herein by reference.

Strobe controller 100 is thus operatively connected through communication link 112 to one or more existing strobes 114 that are designed to work in a TTL mode wherein the camera can both turn on a selected strobe or strobes and cause the flash to be extinguished. Communication link 112 can be a hard wired lead, fiber optic cable or a standard wireless communication link capable of sending control signals to the one or more strobes 114 that change the light output of the strobe.

In operation, when the photographer presses the shutter of camera 102 to take a picture, the strobe controller will receive a signal that is synchronized with the initiation of the camera's image capture, in this example the signal is generated at the camera strobe output port 104. This signal is received by the strobe controller 100 and then passed on to external strobe port(s) 114 to initiate light output of the corresponding external strobe(s). In the case where a pre-flash digital camera is used and the synchronization signal is input into the strobe controller 100 via a sensor 106 receiving the light output from the camera's flash 107, the strobe controller can ignore the pre-flash and then initiate a flash cycle at the beginning of the main flash. After initiating the external strobe(s) light output, the strobe controller 100 then waits for a predetermined time before sending a turn-off signal to the strobe(s) to extinguish it. By varying the amount of time that the strobe controller waits between sending a turn-on signal and a turn-off signal, differing amounts of light can be produced from the external strobe(s).

The strobe controller, by varying the time interval, provides a way for the user to change the amount of light that a strobe is outputting. Thus, the user can take a picture with a digital camera with strobe controller 100 set to turn on the external strobe for a predetermined amount of time. Upon reviewing the picture that was just taken, the user can then operate controls on the user interface 10 of strobe controller 100 to increase or decrease the amount of light that the external strobe outputs on subsequent photos until the photograph looks properly exposed. In this manner the user can achieve the proper exposure by adjusting the strobe output without having to adjust any setting on the camera itself.

To further the ease of use of the strobe controller system, a "profile" of a specific model of an external strobe can be created and stored in the microprocessor to help the user select the appropriate power level. This profile, as will be discussed later, is created for any specific strobe by measuring the length of time that a strobe is turned on and the amount of light output during this time period. By determining the strobe's light output vs. on-time curve, it will be appreciated that the strobe controller can be configured to allow the user to select the amount of light output that the user desires instead of just the time that the strobe is turned on.

The user interface 110 is provided enabling the user to adjust power settings of the one or more strobes independently. The user interface 110 may include a display showing a maximum and minimum range of spectral (power) distribution available from the one or more strobes to enable a user to coordinate power settings of the strobes with a desired camera exposure. For user convenience, light power output can be calibrated in terms of F-stops. Any convenient number of F-stop increments can be used. As a non limiting example, the light output, could be divided into 12 different power settings selectable by the user such that the highest power setting represents the maximum amount of light that the strobe can output, and each setting below that represents an F-stop or some fraction of an F-stop less of light output. The operation represented by adjusting the output light level of the attached strobe or strobes during the course of picture taking represents what is referred to as manual strobe output power control.

When using the strobe controller 100 to independently control multiple strobes simultaneously, the user is required to configure the strobe controller via the user interface 110 by inputting the particular strobes that are being controlled so that the correct stored "profiles" are utilized. The user interface 110 may include independent light output level control for the multiple connected strobes. Therefore the light output of any one of the multiple strobes connected can be adjusted independently without affecting the light output of any of the others. Furthermore, the user interface 110 may include a display that shows the independent light output levels of the multiple connected strobes.

A further enhancement to the strobe controller unit can be constructed for a camera that has the ability to turn a strobe on at the beginning of the exposure and to turn off the strobe when enough light has been received to achieve the proper exposure. This enhancement, for example, could be used with a digital camera that uses a light sensor. In this configuration, the strobe controller would be connected between the camera and strobe as previously explained and would receive both the turn-on signal and the turn-off signal from the camera through port 104. When in Automatic Exposure Mode, the strobe controller 100 would monitor these signals and pass them on to the strobe through its respective strobe port 114, as if the strobe controller 100 were not connected between the camera and strobe. The strobe controller would however, record the time between the turn-on and turn-off signal during each exposure.

Knowing the on-time of the flash and the 'profile' of the strobe being used, the strobe controller 100 will determine and display which of the available power settings the automatic exposure flash cycle was closest to. This feedback is valuable to the photographer because it shows how much light is needed to automatically expose the picture with respect to how much is available. If at any time following an automatic exposure the user activates the strobe controller into Manual Exposure Mode, the strobe controller will be set to the power level that was just determined as the closest power setting. If the user then takes a photo, the TTL stop (turn-off) signal sent by the camera will not be allowed to reach the strobe and instead the strobe controller will send the turn-off signal that corresponds to the power level now set to. The user also now has the ability to change to a new power setting to cause the strobe to output more or less light to achieve the correct exposure. At any time the user can return the strobe controller to Automatic Exposure Mode and the camera will once again control the strobe as if the strobe controller was not attached between the strobe and camera. The above described operation represents what is referred to as manual strobe output power bracketing based on TTL feedback.

It has been proven possible to achieve an automatic exposure function or "point and shoot" capability similar to the previous discussed enhancement even when using a pre-flash Digital Camera and conventional TTL compatible external strobe units. This is achieved by executing a pre-flash with the external strobe simultaneously with the camera's internal pre-flash. In accordance with an aspect of the invention, a system has been developed that will convert the measured on time of the camera's main flash to the required on time of the external strobe to achieve the required exposure. This system can be executed in firmware by using calculated strobe profiles of the supported external strobes and the supported camera's internal strobes as further described here in. This system is successful even while using multiple connected strobes.

Strobe Controller Integral with Camera Housing

Figure 1B:
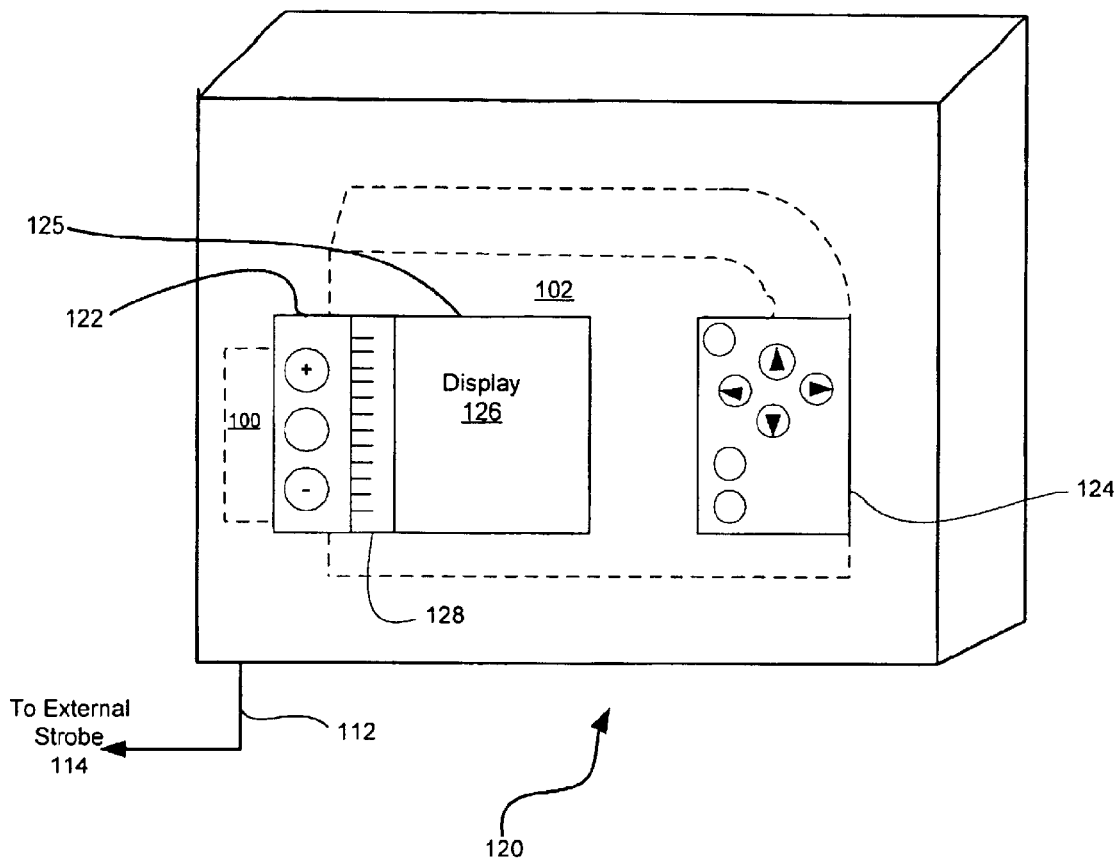
FIG. 1B is a schematic diagram showing the incorporation of a strobe controller into a waterproof housing for operatively enclosing a camera in accordance with an aspect of the present invention.

Referring to FIG. 1B, the strobe controller 100 is provided within or integrated into the interior of a waterproof housing 120 that operatively encloses a camera 102 for use underwater, or use in harsh operating environments. As is well understood by those skilled in the art, the strobe controller 100 can be integrated alone in a waterproof, airtight housing that does not also enclose a camera. In this embodiment, the camera can operate within its own separate waterproof, airtight housing for underwater use or use in harsh operating environments. In such an embodiment, the connections to the camera and strobes are the same as described herein. Strobe controller 100 can be an integrated circuit or circuit board implementation incorporated in the interior wall of the housing 120. Strobe controller 100 can be provided at any convenient location in the interior of the strobe controller housing 120. Strobe controller 100 is operatively connected with camera 102 through camera external output port lead 104, as shown in FIG. 1A. The strobe controller is also operatively linked to one or more strobes 114 through communication link 112. The communication link 112 can be a single conductor plastic optical waveguide, multiple conductor optical waveguide, or radio-frequency communication channel, or, in systems that are capable of modulating the remote light source, three-conductor electrical wire may be used as set forth in U.S. Pat. No. 5,974,273, incorporated herein by reference.

The strobe controller housing 120 includes an internal power supply (not shown) that can be located at any convenient location for powering the strobe controller. The exterior of the housing includes a user interface 122 with a series of controls enabling user input into the strobe controller. A second user interface is provided at 124 on the exterior of the housing 120 and includes a plurality of controls that provide mechanical access to the standard camera controls. The strobe controller housing 120 includes a visual access region 125 enabling the user to view the monitor 126 of the camera 102. The visual access region also includes a display 128 showing strobe light output levels with corresponding controls 122 that coordinate the selected and displayed light output levels for the attached strobe or strobes. In this instance of the invention, the strobe light output can be represented in twelve relative light levels using display 128 which are ½ or full F-stop increments of each other. This advantageously enables a user to adjust the light output of any TTL compatible strobe to any of twelve light output levels ranging from the highest to the lowest available light output.

In this instance of the invention, both the external strobe 114 and camera 102 can be operated through the strobe controller housing 120. The strobe controller housing allows a user to take pictures using digital TTL, manual strobe output power bracketing based on TTL feedback and full manual strobe output power control. Digital TTL refers to the Automatic Exposure Control scheme for pre-flash cameras as described here in.

Manual Flash Operation

Referring to FIGS. 2–5, Strobe-on timetables are constructed for each supported strobe type. Each table includes strobe-on time for each of the supported power levels. Strobe-on timetables are used in order to determine strobe-on time during Manual Exposure Mode and to find the closest supported power level to the measured strobe on time during Automatic Exposure Mode.

Figure 2:
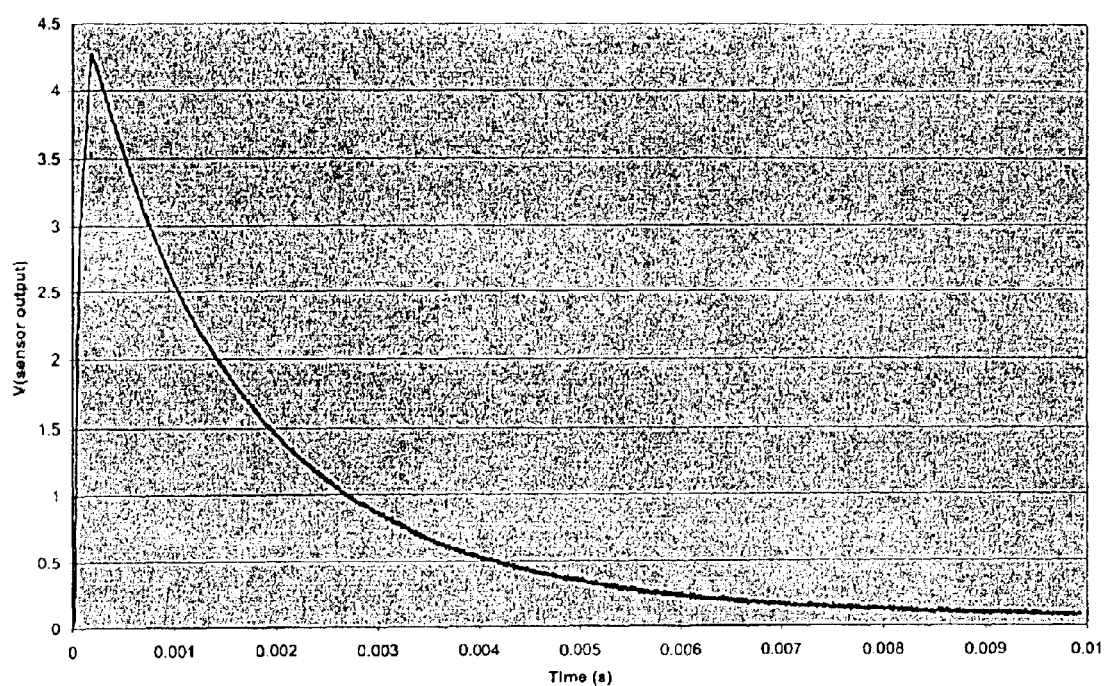
FIG. 2 is a graphical representation of instantaneous strobe light output with respect to time in accordance with an aspect of the present invention.

A strobe-on time table for a given strobe type is constructed by the following procedure:
The strobe's light profile is measured and plotted as a function of sensor output Voltage versus Time as shown in FIG. 2. The transfer function of the sensor used is such that strobe light output is directly proportional to output voltage. The length of the profile must be long enough to capture a full power flash cycle of the strobe used.

Cumulative Strobe Light Output Vs. Time

Figure 3:
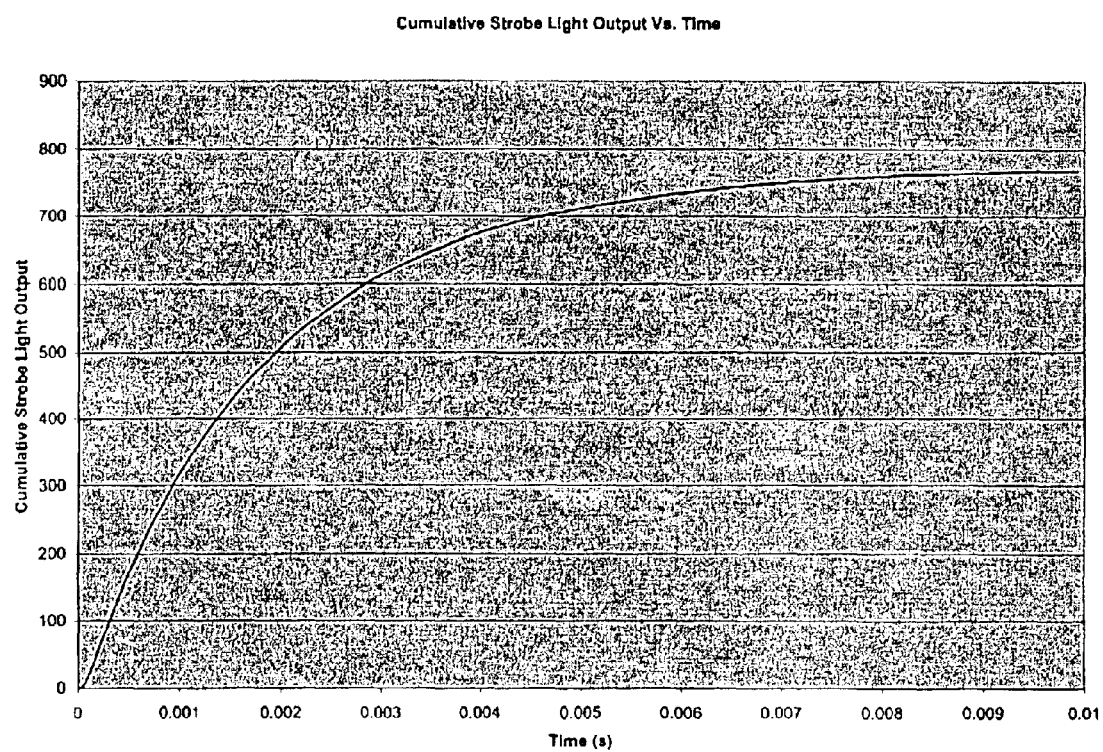
FIG. 3 is a graphical representation of cumulative strobe light output with respect to time in accordance with an aspect of the present invention.

Referring to FIG. 3, for correct photographic exposure it is necessary to know the cumulative light output versus time, and not just the measured instantaneous light output. To calculate the cumulative light output, the instantaneous measured light output is integrated with respect to time:

$$\text{Cumulative Light Output} = \int V(\text{sensor output}) * dt$$

Calculating Strobe On-Time

Referring to FIG. 4, a look up table is constructed. The maximum available light output represented by the strobe's full power flash cycle is shown in FIG. 3 and is represented by 767 units of cumulative light. In this instance of the invention, all of the strobe controller's power levels are represented in ½ and full F-stop values which are a function of this full power light output. Assuming that one uses the 12 power levels shown in FIG. 4, a numerical value of Cumulative Light needed for a given F-stop can be calculated. Then, the Cumulative Light Output vs. Time curve shown in FIG. 3 can be used to determine the strobe-on time associated with a corresponding value of cumulative light output.

Strobe Light Output Table Implementation

Figure 5:
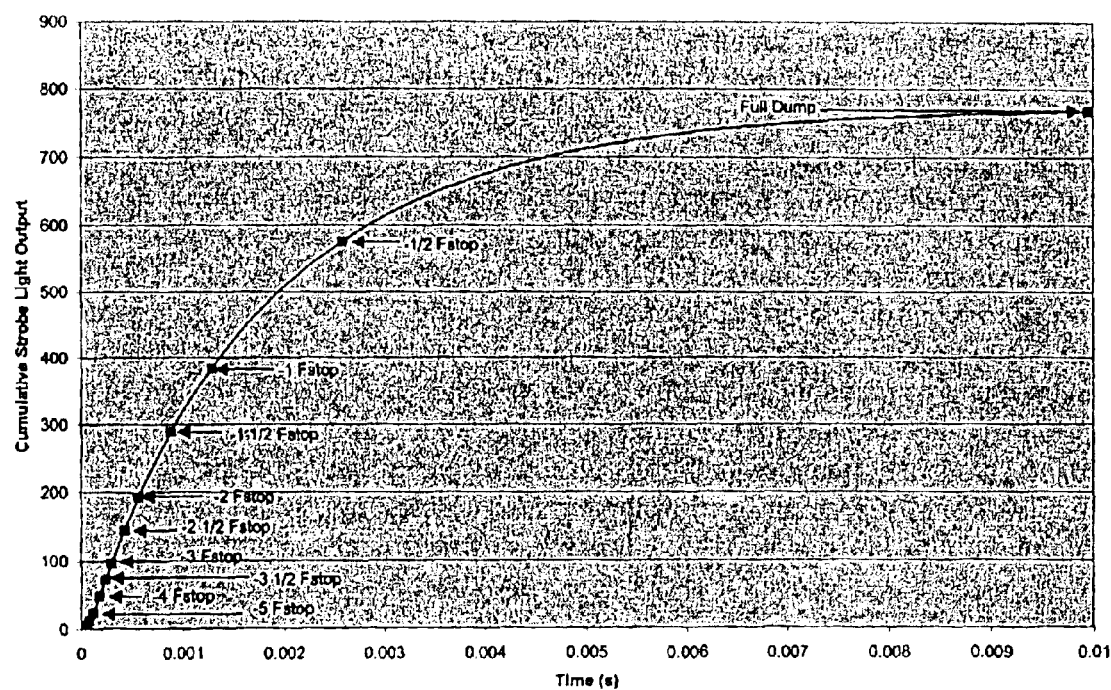
FIG. 5 is a is a graphical representation of cumulative strobe light output with programmed power levels with respect to time in accordance with an aspect of the present invention.

Referring to FIG. 5, the graph shows the final calculated strobe-on times associated with the available light output levels superimposed onto the previously calculated Cumulative Light Output curve. The Strobe-On Time vs. Power Level table of FIG. 4 is used in firmware to execute the proper timing of the strobe turn-on and turn-off signals to achieve the desired power levels for the given external strobe type. A Strobe-On timetable must be calculated for each strobe type that is supported.

Pre-Flash Automatic Exposure Scheme

A pre-flash exposure scheme uses two successive flashes, a pre-flash and main flash. The pre-flash is used to cast a set amount of light on the subject and a sensor located on the camera reads the amount of light reflected and adjusts the amount of light during the main flash for proper exposure. The strobe controller can support automatic exposure using a pre-flash camera by using the following developed scheme. This method requires that the camera's internal flash be shielded from or blocked from the subject such that the light generated from it does not in any way contribute to the exposure of the image taken. The external strobe or strobes being used must be aimed to output light onto the subject being photographed. This enables the camera to sense the pre-flash light output of the external strobe(s).

Figure 6:
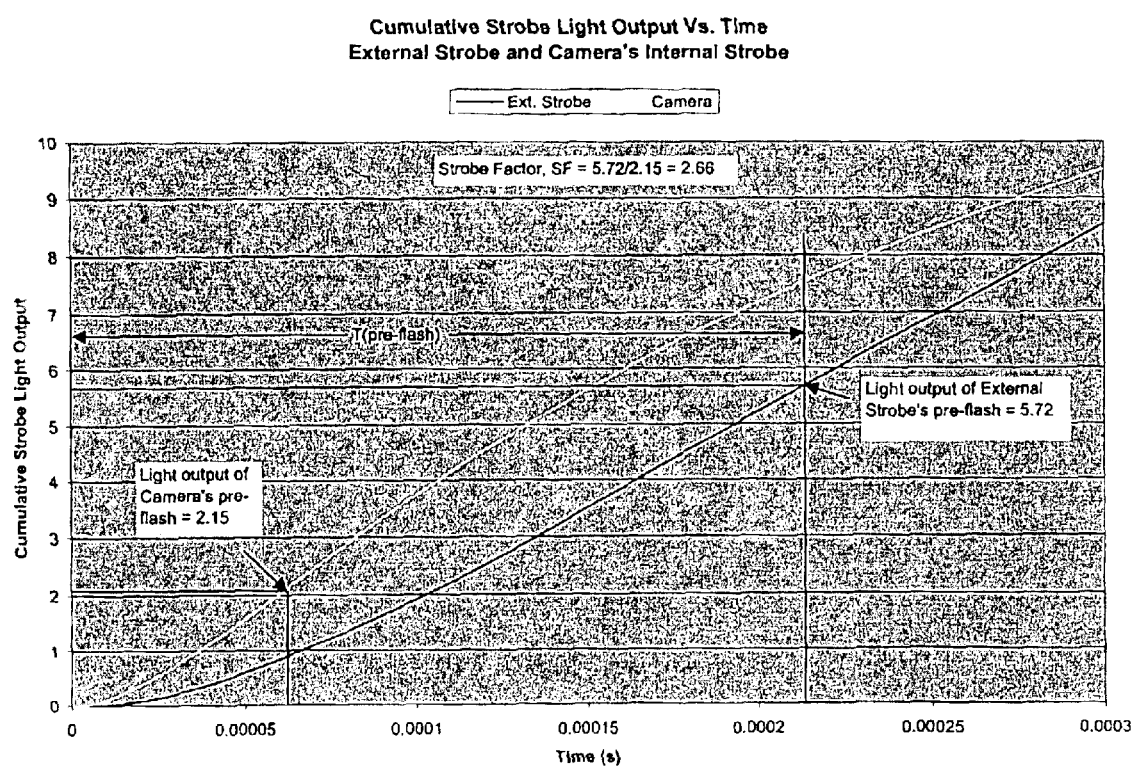
FIGS. 6 and 7 are graphical representations of cumulative strobe light output with respect to time for an external strobe and a camera's internal strobe in accordance with an aspect of the invention.

Referring to FIG. 6, strobe profiles are recorded to calibrate this scheme for each supported external strobe and camera. Each external strobe's profile must be taken relative to the strobe profile of the supported camera's internal strobe in order make a direct comparison in the magnitude of their light output. This can be accomplished by keeping the distance between the light sources and sensor constant. The ratio of the pre-flash light output available from the external strobe with that of the camera is the required Strobe Factor, SF. The value of SF is determined as follows.

$$SF = \int (0, T\text{pre-flash}) \, V(\text{External Strobe}) * dt / \int (0, T\text{pre-flash}) \, V(\text{Internal Strobe}) * dt$$

T pre-flash=The window of time the supported camera measures the light reflected during the pre-flash.

The graph in FIG. 6 shows how the Strobe Factor ("SF") is calculated. The amount of light given by the camera's pre-flash is found using its strobe profile and measuring its duration. Setting the external strobe's pre-flash duration to T pre-flash, the amount of light given by the external strobe's pre-flash is then found. After determining the light output of both the camera's and the external strobe's pre-flash, SF can be calculated. T pre-flash, in this example, has been found to be longer than the camera's actual strobe pre-flash duration. This is advantageous because allowing a longer external strobe pre-flash duration results in a higher external strobe pre-flash light output and thus a higher SF. The strobe controller's Pre-Flash Automatic Exposure system uses SF to convert the measured light output of the camera's internal main flash to the light output needed at the external strobe for the proper exposure. As long as the external strobe's pre-flash is kept constant the following relationship will obtain a sufficient exposure of the external strobe's main flash with respect to the light output of the camera's internal main flash.

Light of External Strobe Main Flash=$SF$×Light of Camera's Internal Main Flash

There is, however, an upper limit to how much light this method can support because of the limitations of the amount of time available to measure the pre-flash light during the pre-flash cycle. The maximum light output that the external strobe can deliver and still be consistent with the method is the product of the calculated SF and the maximum light output of the camera's strobe.

Cumulative Light output vs. Time

Figure 7:
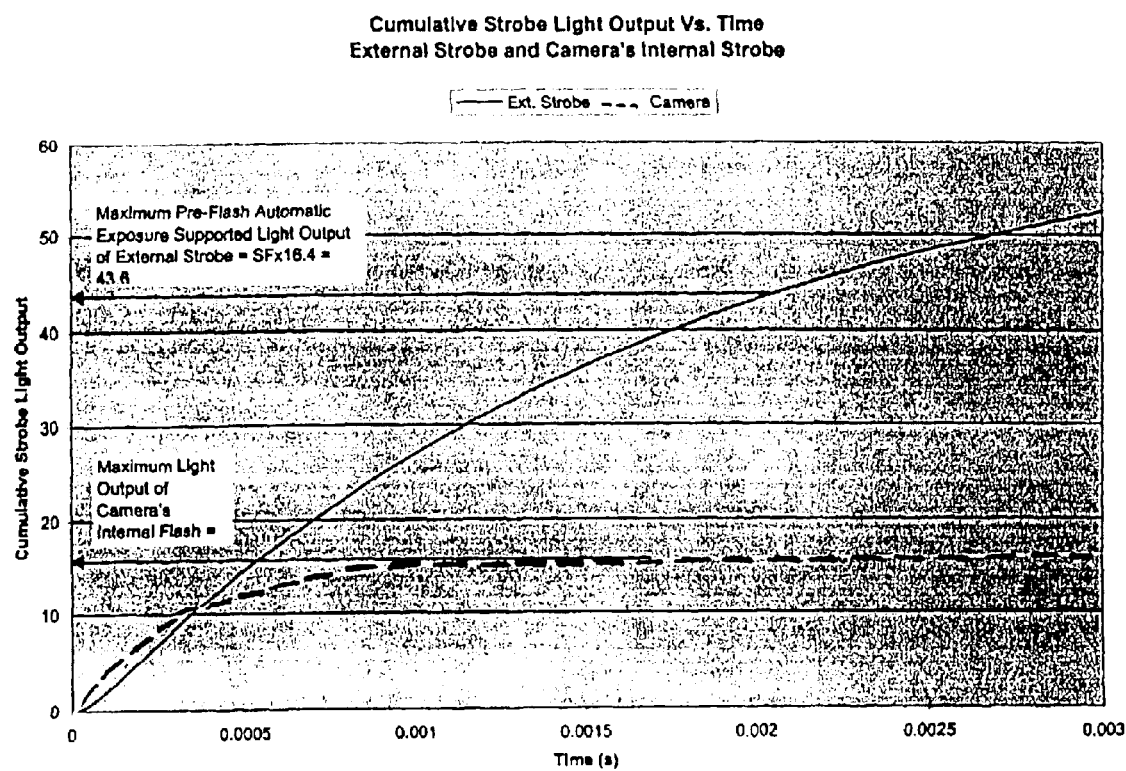

Referring to FIG. 7, a graph shows Cumulative Light output vs. Time for the working example previously discussed. This example shows that the camera's flash can output a maximum of 16.4 units of light. Using the previously calculated value of SF equal to 2.66, the maximum amount of light that can be supported by the used external strobe is therefore 2.66×16.4 or 43.6 units. Referring to FIG. 7, this is less than the total amount of light that the external strobe can deliver. This shows that a limitation exists which reduces the amount of light with respect to the external strobe's maximum light output that can be achieved for proper exposure. The system does however inherently support the use of multiple external strobes. When using two external strobes, for example, there is roughly twice as much light available during the pre-flash, enabling the user to approximately double the amount of light output that the pre-flash Automatic Exposure method supports.

In summary, the strobe controller commands the external strobe to pre-flash simultaneously with the camera's pre-flash. The strobe controller then detects and measures the camera's main flash length. Using a look up table scheme constructed from the calculated SF shown in FIG. 6, the controller converts the camera's internal strobe-on time to the necessary external strobe-on time to achieve the proper exposure. The strobe controller then completes the flash cycle by commanding the external strobe to execute the calculated external strobe-on time.

Strobe Controller Operation and Firmware Structure

Figure 8:
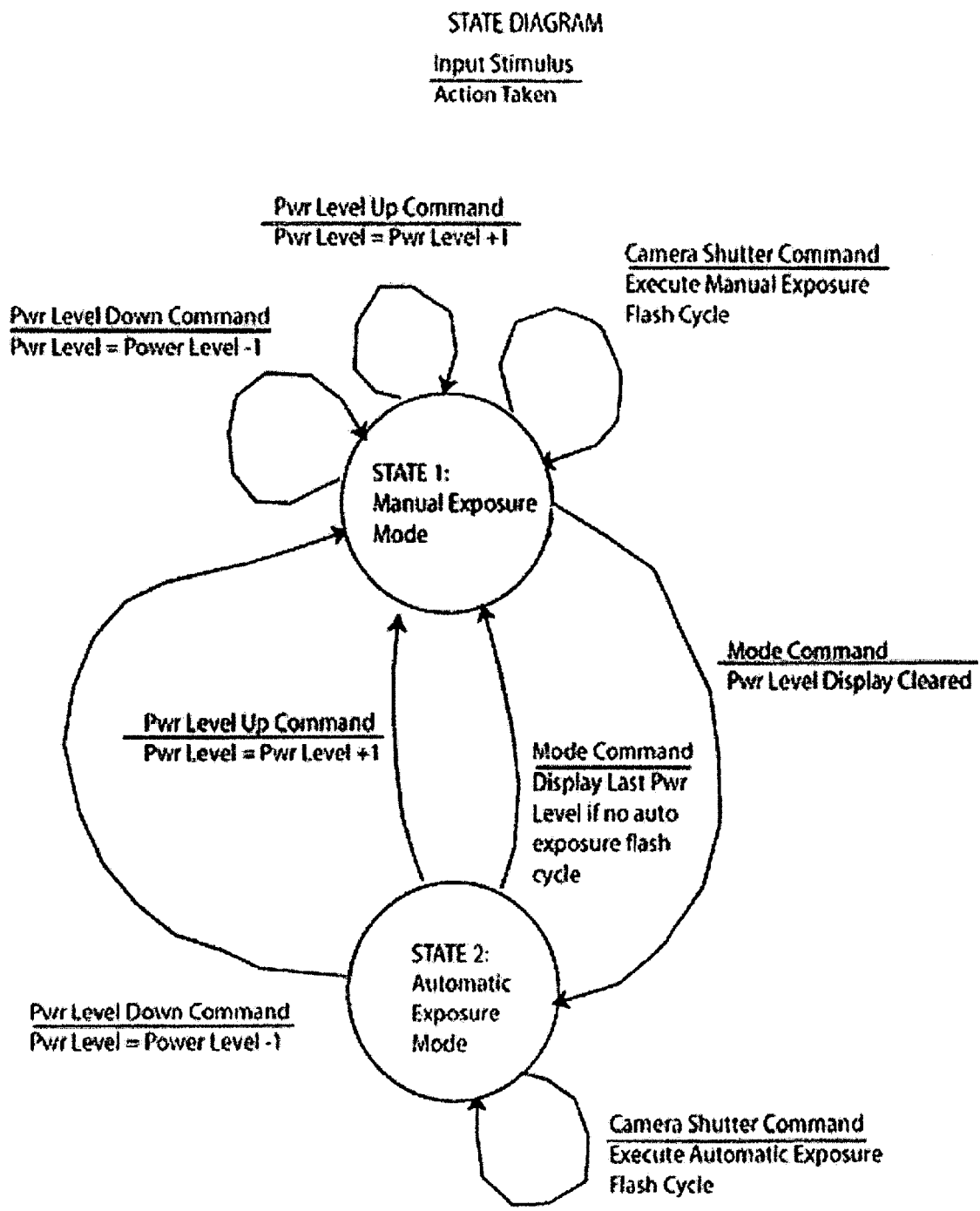
FIG. 8 is state diagram for the strobe controller in accordance with an aspect of the invention.

Referring to FIG. 8, a state diagram describes the functioning of the strobe controller. Two states, Manual Exposure Mode and Automatic Exposure Mode exist regardless of pre-flash or non-pre-flash function. The state diagram shows how these states are entered and what occurs when all of the inputs to the strobe controller are given.

When in Manual Exposure Mode, the power level is always displayed and updated with the power level up and down commands. If the camera gives a shutter command, the manual exposure flash cycle routine is given.

The only way to enter Automatic Exposure Mode is to give the mode command. When this occurs, the strobe controller clears the power level display to show that a flash cycle has not yet been executed. When in Automatic Exposure Mode and the camera gives a shutter command, the automatic exposure flash cycle is executed. After this occurs, the recorded power level will be displayed.

After an automatic exposure flash cycle is completed the user, by giving a mode command, can switch back to Manual Exposure Mode and save the recorded power level. The user can also adjust the recorded power level up or down when entering into manual mode by giving a power level up or down command. This has been previously referred to as manual strobe output power bracketing based on TTL feedback. If a mode command is given before an automatic exposure flash cycle is executed, then the last known power level is displayed.

Before executing a flash cycle, the firmware continually updates the required strobe-on time for the selected power level and strobe type. This minimizes the amount of time that it takes to start a flash cycle after receiving the camera's shutter command.

The following are descriptions of the attached manual and automatic exposure flash cycle flowcharts for both pre-flash and non-pre flash systems Strobe Controller Manual Flash Control (Non-Pre-Flash)

Figure 9:
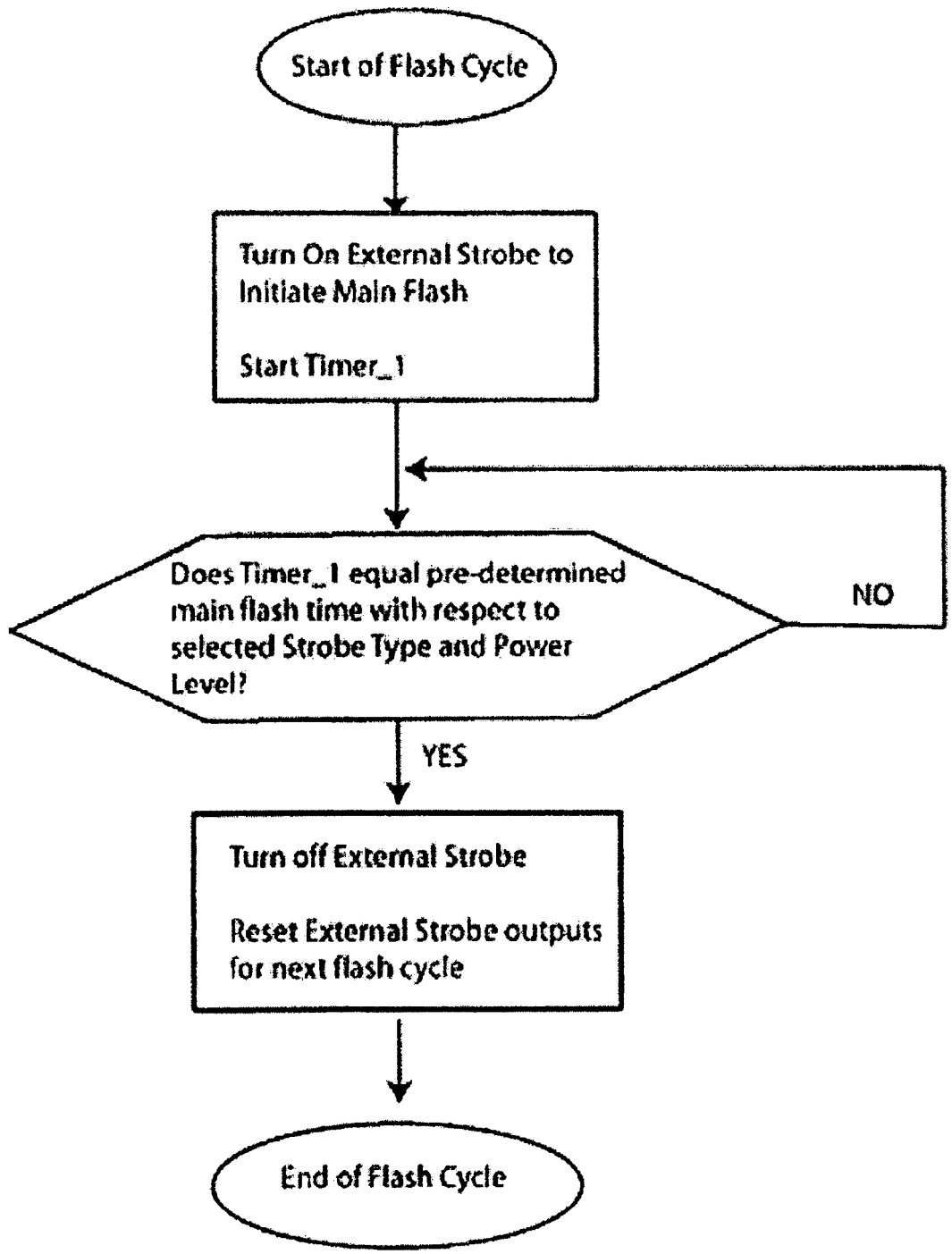
FIG. 9 is a logic flow diagram for manual flash control (non-pre-flash) in accordance with an aspect of the invention.

FIG. 9 shows a logic flow diagram for the strobe controller's manual mode without pre-flash. The external strobe's flash is started immediately and then a timer is used to compare with the required strobe-on time. Once this comparison is found, the external strobe's flash is stopped completing the external strobe's flash. Finally, the external strobe's outputs are reset for the next flash cycle and the current flash cycle is complete.

Strobe Controller Automatic Flash Control (Non-Pre-Flash)

Figure 10:
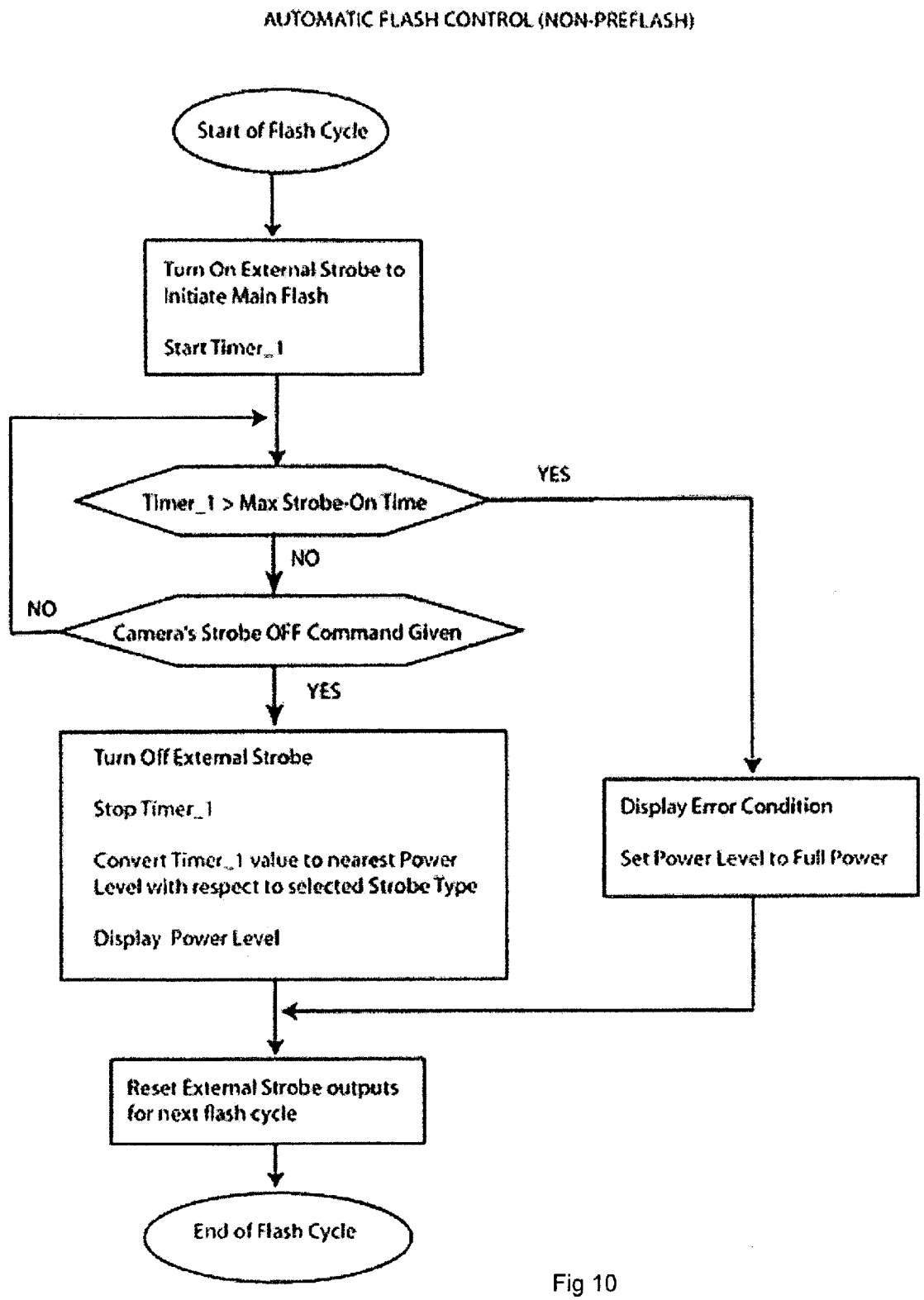
FIG. 10 is a logic flow diagram for automatic flash control (non-pre-flash) in accordance with an aspect of the invention.

FIG. 10 is a logic flow diagram for the strobe controller's automatic mode without pre-flash. The external strobe's flash is started immediately and a timer is used to measure the length of time until the camera gives the flash stop command. When this occurs, the external strobe's flash is immediately turned off and the nearest power level according to the selected strobe type is found and displayed. If the camera does not give the flash stop command in the maximum allowable time, then an error condition exists because the camera did not receive the necessary light output from the strobe to complete the desired exposure. When this occurs, an error is displayed to the user and the power level is updated to full power. Finally, the external strobe's outputs are reset for the next flash cycle and the current flash cycle is complete.

Strobe Controller Manual Flash Control (Pre-Flash)

Figure 11:
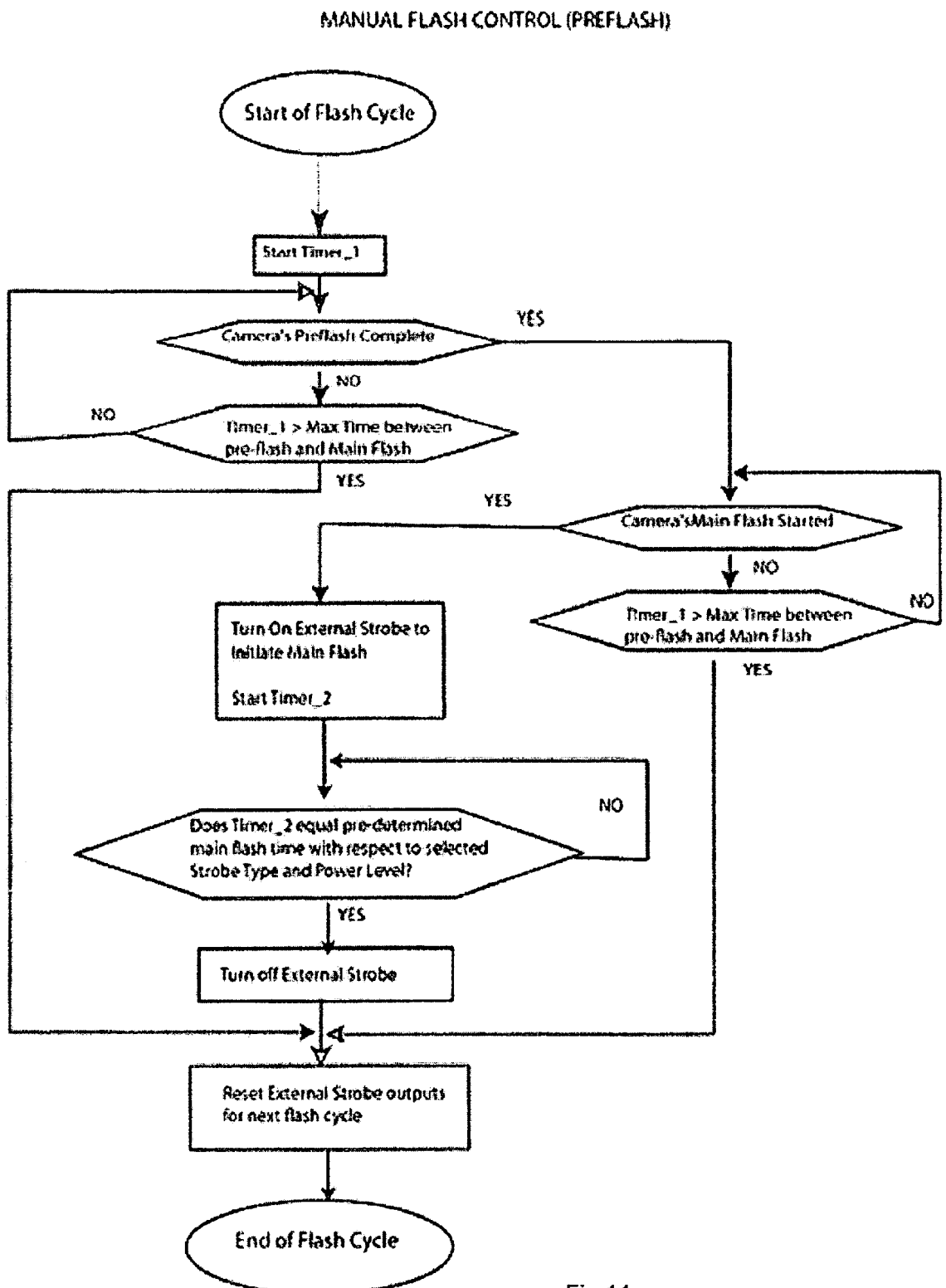
FIG. 11 is a logic flow diagram for manual flash control (pre-flash) in accordance with an aspect of the invention.

FIG. 11 is a logic flow diagram showing the strobe controller manual mode with pre-flash. In this mode, the pre-flash of the camera is ignored and the external strobe is fired at the start of the camera's main flash. A timer is started at the beginning of the flash cycle and the camera's flash is monitored. Once the camera's main flash is detected, the external strobe's flash is turned on and a second timer is started and is used to compare with the required strobe-on time. Once the required strobe-on time is achieved external strobe's flash is stopped. If the camera's main flash is not detected within a pre-determined maximum allowable time, then it is assumed that an error occurred and the external strobe's flash is skipped. Finally, the external strobe's outputs are reset for the next flash cycle and the current flash cycle is complete.

Strobe Controller Automatic Exposure Control (Pre-Flash)

Figure 12:
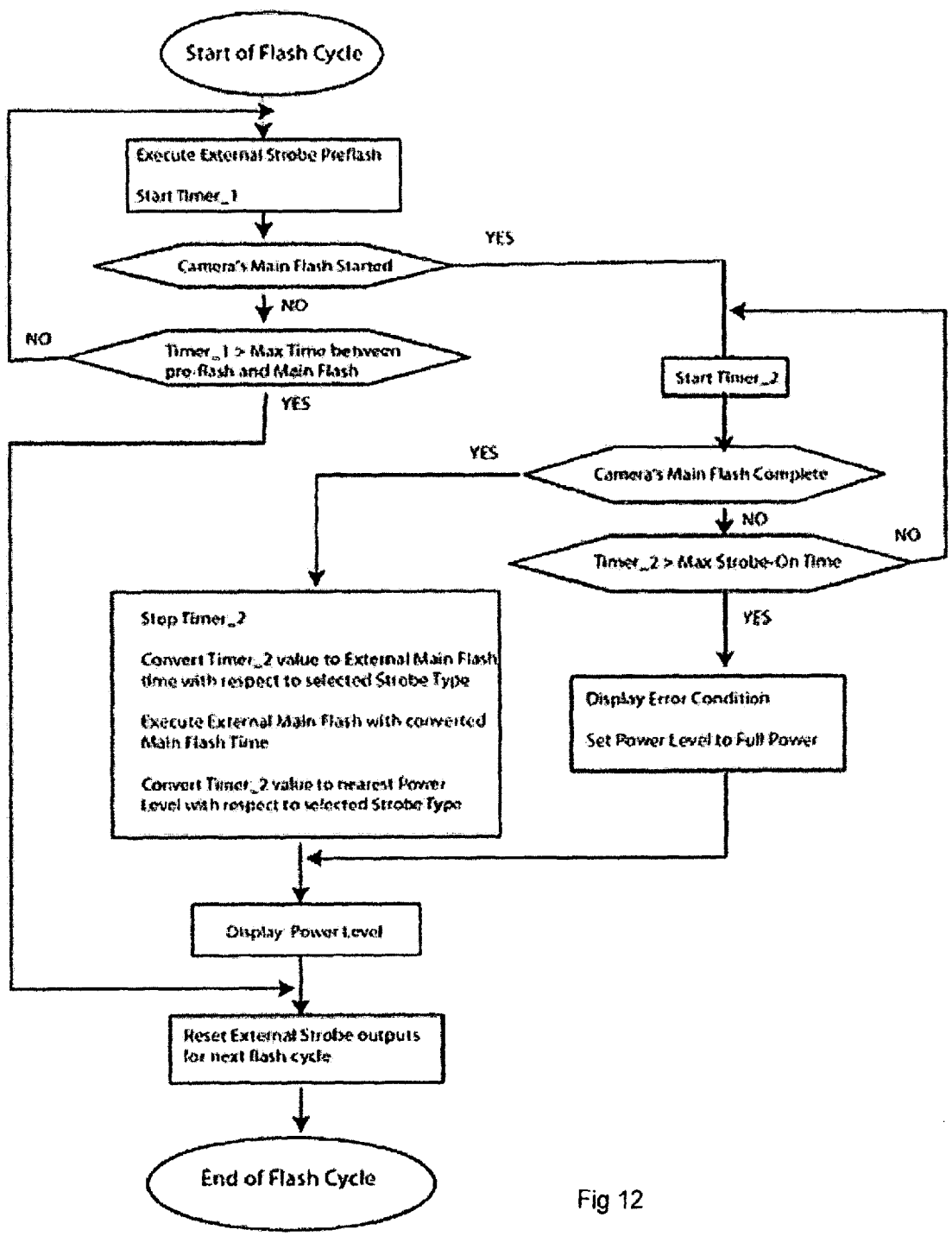
FIG. 12 is a logic flow diagram for automatic flash control (pre-flash) in accordance with an aspect of the invention.

FIG. 12 is a logic flow diagram showing the strobe controller automatic mode with pre-flash. The external strobe's flash is turned on for a pre-determined time, as discussed previously, to execute a pre-flash. A timer is started and the camera's flash is monitored. If the camera's main flash is not detected within a pre-determined maximum allowable time, then it is assumed that an error occurred and the external strobe's main flash is skipped. This maximum allowable time is camera specific and is derived by the duration between the camera's pre-flash and main flash. Once the start of the camera's main flash is detected, a second timer is used to measure the duration of the camera's main flash. After the camera's main flash has been completed, the firmware converts the measured flash duration to the necessary external strobe-on time according to the selected strobe type. It then executes the external strobe for this amount of time completing the external strobe's main flash. The external strobe's main flash time is then converted to the nearest power level according to the selected strobe type. The power level is updated and then displayed. If the camera does not complete its main flash in the maximum allowable time, then an error condition exists because the camera did not receive the necessary light output from the strobe to complete the desired exposure. When this occurs, the error is displayed to the user and the power level is updated to the maximum supported power level. Finally, the external strobe's outputs are reset for the next flash cycle and the current flash cycle is complete.

Scope

While the invention has been described in connection with what are presently considered to be the most practical and preferred embodiments, it is to be understood that the invention is not limited to the disclosed embodiments and alternatives as set forth above, but on the contrary is intended to cover various modifications and equivalent arrangements included within the scope of the appended claims.

For example, one skilled in the art will recognize that the strobe controller and user interface that enable interoperability between a camera and one or more strobe units can be provided in or integrated in many different types of protective enclosures, thereby enabling a camera to function with strobe lighting underwater, or in a severe operating environment wherein it is necessary to protect the camera. Also, the protective enclosure can house the strobe controller alone. The camera can operate from its own separate enclosure. However, the connections to the camera, strobe controller and strobe(s), and the system for operating the strobes would be the same as described herein.

One skilled in the art will recognize that the strobe controller system need not embody both manual and automatic modes of operation, and that each of these modes could be implemented separately. Also, wireless, fiber optic or electrical communication links can be used to send signals from the controller to activate the strobes in response to user input. However, all such equivalent arrangements would still incorporate the core concepts of strobe and camera interoperability and the control system enabling a user to adjust power settings of one or more strobes in conjunction with camera operation as described herein.

Therefore, persons of ordinary skill in this field are to understand that all such equivalent arrangements and modifications are to be included within the scope of the following claims.

What is claimed is:

1. A system for use in underwater or harsh environments for controlling light output of one or more strobes from a digital camera to provide a desired exposure comprising:

a digital camera having a means for providing external synchronization signals at the start of image capture, one or more external strobes, each strobe having an input port responsive to the activation signals for controlling on time of the respective strobe;

a strobe controller including a microprocessor comprising:

an input port responsive to said external synchronization signals;

a digital control interface providing an input to the microprocessor for enabling the user to select a predetermined on time of one or more strobes;

an output port communicatively linked to the input port of said one or more strobes; wherein the microprocessor activates the one or more strobes to flash simultaneously with the external synchronization signal from the camera and extinguishes said one or more strobes after the predetermined amount of on time as selected by the user through the control interface.

2. A system according to claim 1, wherein the digital camera comprises:

a flash unit that outputs a flash of light providing an external synchronization signal at the start of image capture.

3. A system for use in underwater or harsh environments for controlling light output of one or more strobes from a digital camera to provide a desired exposure comprising:

a digital camera having a flash and means for generating flash on and off signals and for providing a pre-flash exposure and a main flash;

one or more external strobes, each strobe having an input port responsive to activation signals for controlling on time of the respective strobe;

a strobe controller including a microprocessor comprising: an output port communicatively linked to the input port of said one or more strobes; a light sensor that measures the pre-flash output from the camera and providing signals representative thereof to the microprocessor; wherein the microprocessor activates the one or more external strobes to pre-flash simultaneously with the camera's pre-flash and determines an external strobe-on time for each strobe corresponding to the camera's main flash-on time to thereby achieve a proper exposure.

4. A system according to claim 3, wherein the microprocessor for determining strobe on time further comprises:

circuitry responsive to flash on and off signals generated by the pre-flash exposure and for calculating a strobe power factor as a ratio of the pre-flash light output available from each external strobe with respect to the pre-flash of the camera;

a lookup table of values for the strobe power factor including relative light output for each strobe, and relative light output of the camera's strobe and;

means responsive to flash on and off signals of the camera's main flash length and for calculating strobe-on time of a selected external strobe to correspond with the camera's flash on time;

means for commanding the external strobe to execute the calculated external strobe-on time and achieve the proper exposure.

5. A strobe controller incorporated in a housing for interfacing between a digital camera including a means for producing flash on/off signals and one or more external strobes and for controlling power settings of the strobes to achieve a desired exposure comprising:

a waterproof housing comprising an interior surface configured for operatively enclosing a digital camera for use underwater or in harsh environments, the housing including a first transparent region enabling the camera to image a subject and a second transparent region enabling a user to view camera images, a strobe controller including a microprocessor provided in the interior surface of the housing, the strobe controller having a first connection responsive to flash on/off signals generated by the camera and a second connection for controlling one or more external strobes in coordination with the camera's flash;

a first control interface provided on the exterior surface of the housing and operatively connected to the camera, enabling a user to operate the camera;

a second control interface provided on the exterior housing enabling the user to adjust power settings of the one or more strobes; the second control interface including a visual display showing a maximum and minimum range of spectral (power) distribution available from the one or more strobes to enable a user to coordinate power settings of the probes with a desired camera exposure.

6. A strobe controller according to claim 5 wherein the visual display of the second control interface further comprises a series of F stop ranges corresponding to camera shutter settings superimposed on the second viewing region.

7. A strobe controller incorporated in a watertight housing for interfacing between a digital camera including a means for producing flash on/off signals and one or more external strobes and for controlling power settings of the strobes to achieve a desired exposure comprising:

a watertight housing comprising an interior surface configured for operatively enclosing the strobe controller, the strobe controller including a microprocessor having a first connection responsive to flash on/off signals generated by the camera and a second connection for controlling one or more external strobes in coordination with the camera's flash;

a control interface provided on the exterior surface of the housing and operatively connected to the camera and the one or more strobes, enabling a user to coordinate the camera's flash with lighting from the one or more strobes to achieve a desired exposure.

* * * * *